Dec. 30, 1952 F. ROBERT 2,623,846
COKE OVEN WITH REGENERATOR FLOW CONTROL
Filed May 20, 1948 6 Sheets-Sheet 1

INVENTOR.
FERNAND ROBERT.
BY Thomas J. P. O'Brien
ATTORNEY.

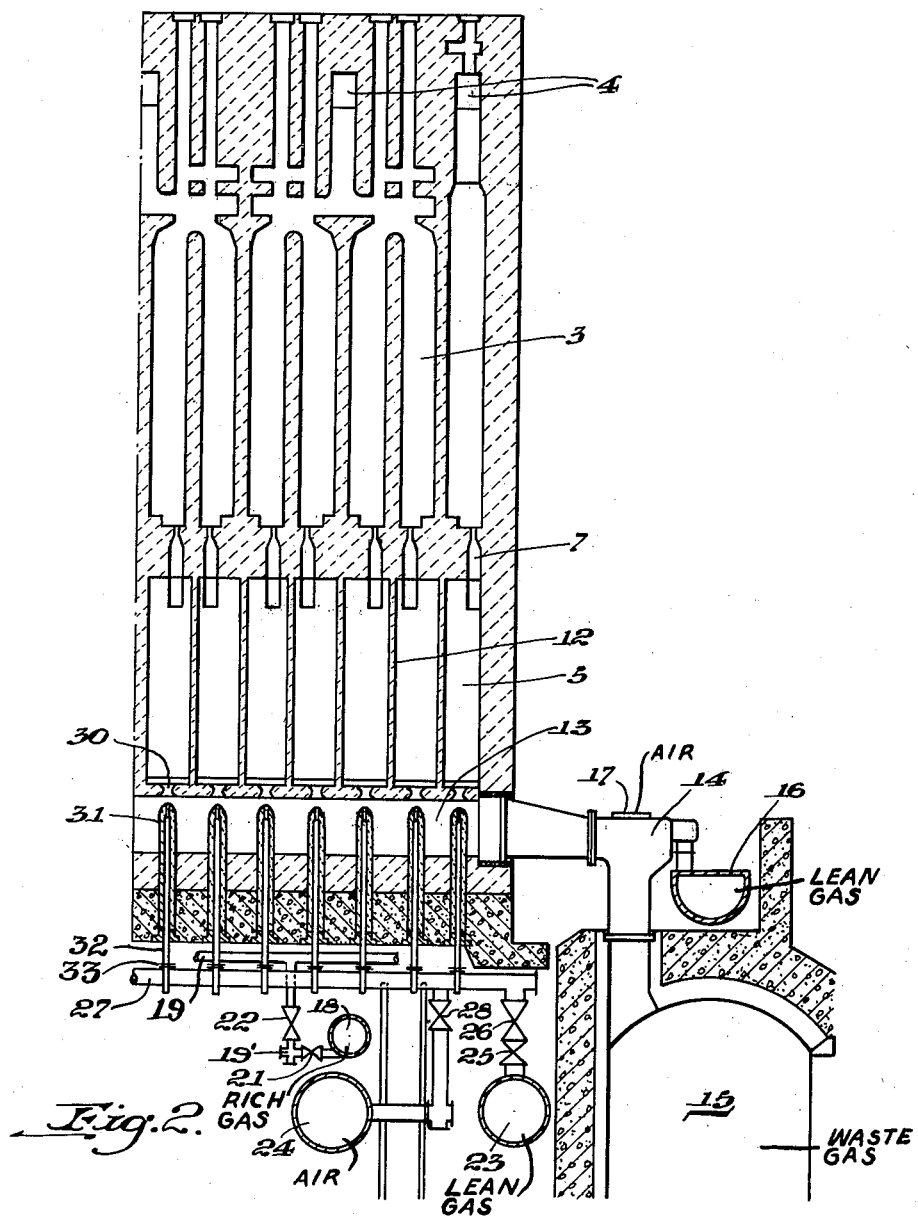

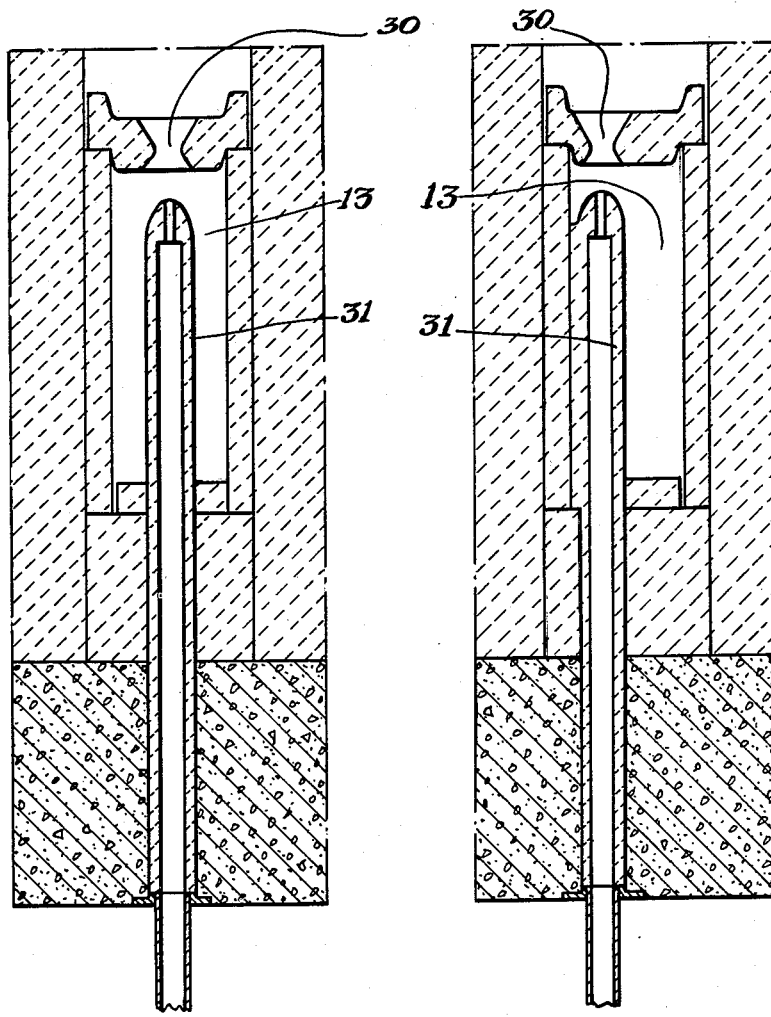

Dec. 30, 1952  F. ROBERT  2,623,846
COKE OVEN WITH REGENERATOR FLOW CONTROL
Filed May 20, 1948  6 Sheets-Sheet 4
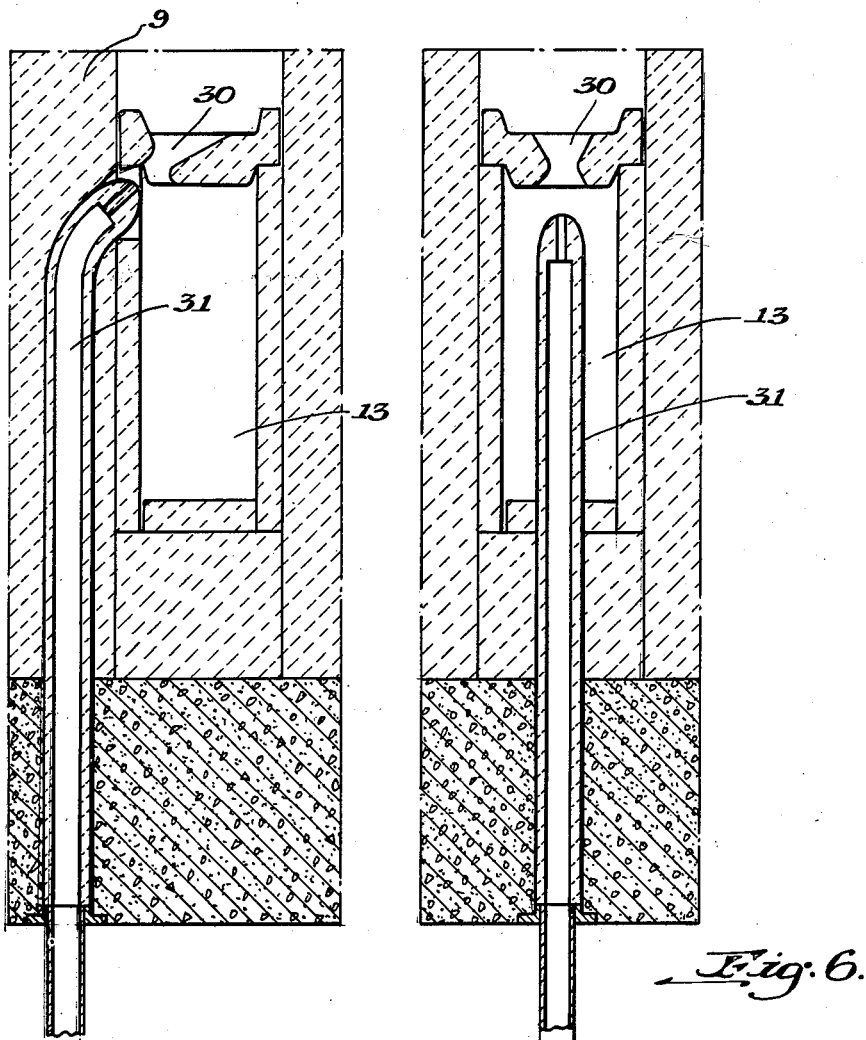
Fig. 5.
Fig. 6.
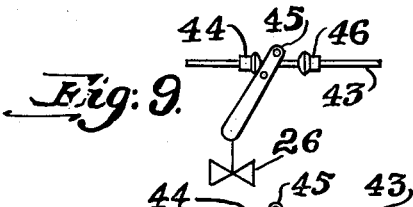
Fig. 9.
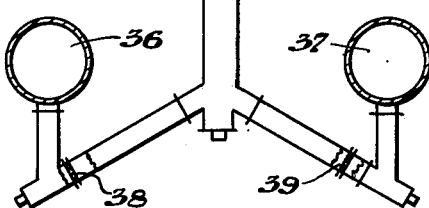
Fig. 10.
INVENTOR.
FERNAND ROBERT.
BY Thomas J. P. O'Brien
ATTORNEY.

Dec. 30, 1952        F. ROBERT        2,623,846
COKE OVEN WITH REGENERATOR FLOW CONTROL
Filed May 20, 1948        6 Sheets-Sheet 6

INVENTOR.
FERNAND ROBERT.
BY Thomas J. O'Brien
ATTORNEY.

Patented Dec. 30, 1952

2,623,846

UNITED STATES PATENT OFFICE 2,623,846

COKE OVEN WITH REGENERATOR FLOW CONTROL

Fernand Robert, Paris, France, assignor to Koppers Company, Inc., a corporation of Delaware Application May 20, 1948, Serial No. 28,064
In France May 22, 1947

5 Claims. (Cl. 202—142)

Coke ovens are known in which the rich gas to be burned without any pre-heating in a regenerator is led directly to the bottom of each heating flue through separate pipes, which makes it possible to control the distribution of the gas amongst the various flues with the aid of means located outside the ovens.

Ovens of this kind are known by the name of "individual burner ovens" as well as by the name of "underjet ovens," which term connotes that the ovens are built on a platform below which a spacious room is provided in which the gas distribution means are installed.

The gas is thus distributed in the cold state with the aid of members, as diaphragms, lending themselves to accurate calibration; the distribution thus obtained is stable, i. e. will remain wholly independent of the working of the ovens as well as of the heating power or the specific weight of the heating gas.

In view of the advantages inherent to ovens of this type from the viewpoints of uniformity in working and heat economy it has been attempted to apply the same principle to the heating of the ovens by means of lean gas derived from gas producers or blast furnaces.

However, where lean gas is used for oven heating purposes, it is necessary to pre-heat the gas prior to its combustion, by recovering and utilizing the sensible heat available in the smoke or combustion gases for preheating. It is much more difficult to supply the several flues individually with lean gas than with rich gas; in fact, no satisfactory solution has been given by any of the methods recommended heretofore to the problem of uniformly distributing lean gas among the several flues.

The present invention relates to a coke oven of the kind in which a more correct distribution of the heating gas can be obtained equally well, whether rich or lean gas is used for the heating, by means of complementary devices dealing with cold gas and located outside the oven proper.

With this end in view, the distributing sole channel or regenerator sole flue at the bottom of the regenerators communicates with each of the various regenerative compartments of said regenerators through a convergent-divergent orifice directly connecting the regenerator sole flues with the regenerative chambers of the regenerators, and with each orifice member there is associated a complementary nozzle to be supplied with a portion of the total of the air or of the fuel gas assigned to the combustion process; the complementary nozzles are in the sole channels and are connected with pipe lines through which air, spent combustion gases or an inert gas can be supplied thereto in those periods when the related regenerator is to be supplied by the heating flues with spent combustion gases for outflow to the stack. In addition, the nozzles are connected with pipe lines through which complementary air of fuel gas can be supplied thereto in those periods when the regenerator is to be fed with air or with fuel gas for inflow to the heating flues, or else, air or an inert fluid can be supplied thereto in those periods when said regenerator is to be fed with spent combustion gases from the heating flues for outflow to the stack. The rates of flow of the complementary air, fuel gas, or inert fluid, supplied during the various inflow and outflow periods, are so adjusted that equal pressures are maintained in the various compartments of the regenerators. Arranged in the regenerators in correspondence with the various flues and separated from the remainder of the regenerators are stacks the bottom ends of which communicate with the sole channel in the base of the regenerator through a convergent-divergent orifice associated with a nozzle.

In each instance the nozzles discharge into the sole flues at the inlet side of the orifice members so as to induce flow of the gaseous medium from the regenerator sole flue through the orifice into the regenerative area of the regenerator, at the outlet end of the orifice member, on inflow, and resist or retard or repress outflow through the orifice member into the sole channel, on outflow operation of the regenerator, all as will be apparent from an inspection of the drawings.

A particular preferred embodiment as well as alternative constructions of a coke-oven according to the invention will now be described, reference being had to the appended drawing in which:

Figure 2 is a longitudinal section of a portion of an oven taken through a heating wall and the axis of a regenerator;

Figure 3 is an enlarged detail sectional view of the bottom of a regenerator;

Figures 4 and 5 are similar views of alternative constructions according to the invention;

Figure 6 is a sectional view of a portion of the bottom of a modified form of the regenerator;

Figure 7:
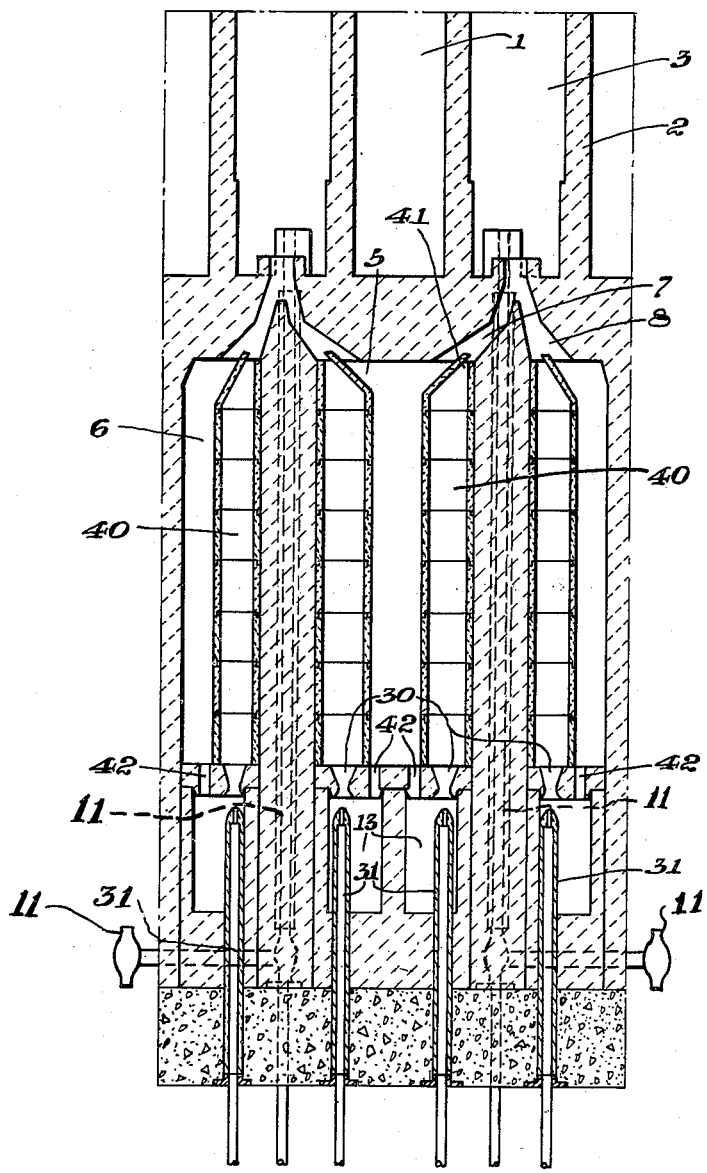
Figure 7 is a cross section of another embodiment of the invention
Figure 8:
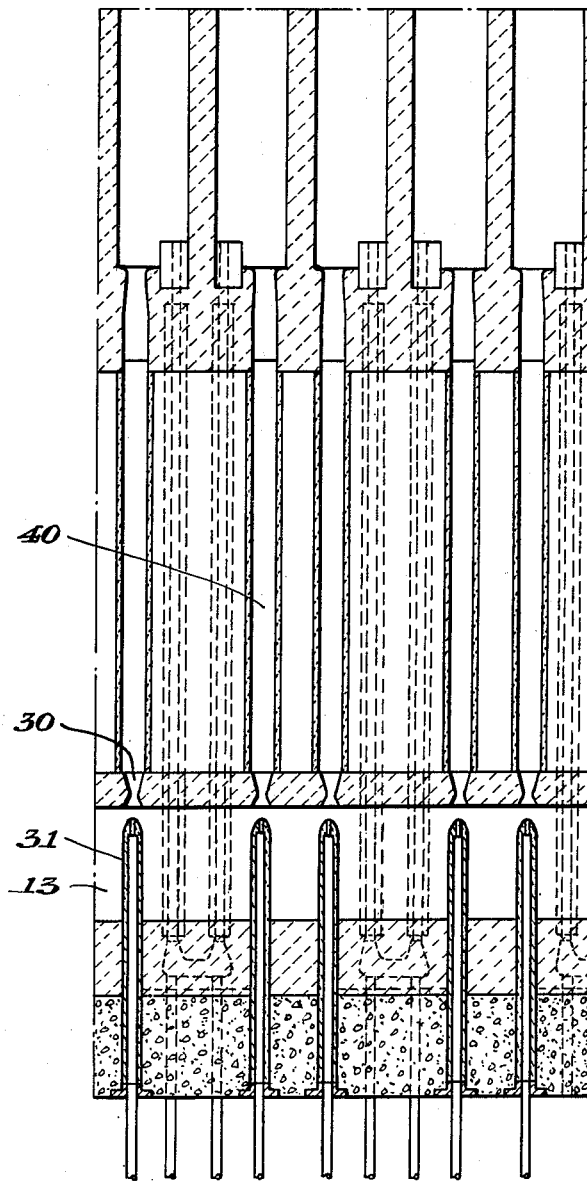

Figure 8 a longitudinal section of Fig. 7 and

Figs. 9 and 10 diagrammatically illustrate the conventional reversing mechanism for the purpose of the present invention.

Figure 1:
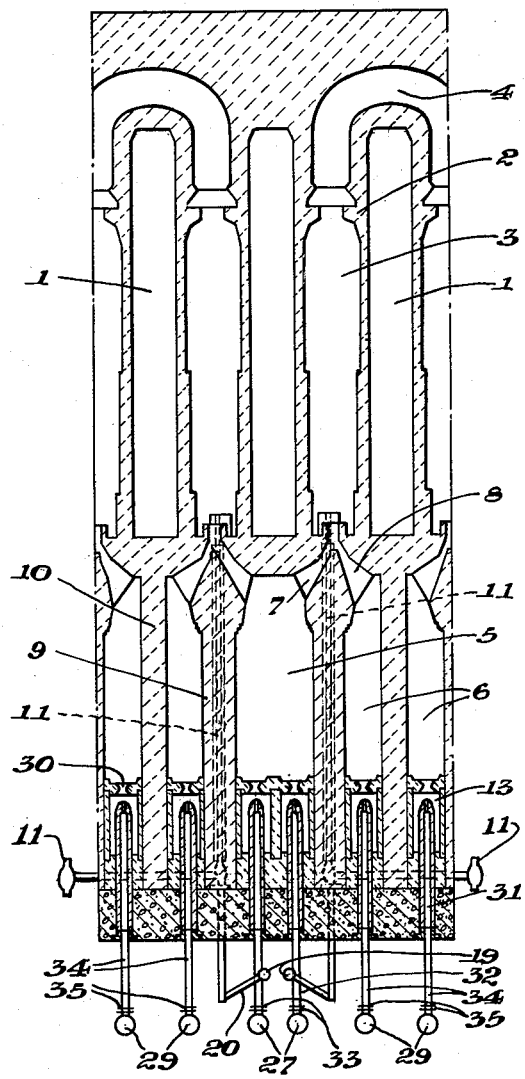
Figure 1 is a cross sectional view of a portion of a coke oven battery built according to the invention.

As illustrated in Figs. 1 and 2 the oven battery is composed of a series of horizontal coking ovens 1 separated by intermediate heating walls 2 having a plurality of vertical heating flues 3 provided therein.

In ovens of the kind illustrated the various heating flues 3 in each wall 2 are connected with the corresponding heating flues 3 in the adjacent wall 2 through a number of crossover ducts or channels 4 that arch the oven crown, yet the invention also applies without any modification to other oven types in which the heating flue circuits are arranged differently.

Provided directly beneath the heating walls 2 and coking chambers of the ovens 1 are the regenerators 5 for gas or air and 6 for air which are connected in pairs with the heating flues 3 in the walls 2 through regenerator ducts or passageways 7 and 8. The regenerators are separated from one another by walls 9 and 10. The walls 9 which are erected below the oven heating walls 2 are provided with vertical pipes 11 through which the rich gas is led to the bottom of the heating flues unpreheated by the regenerators. The walls 10 are located beneath the alternate ovens 1 and separate the narrow air regenerators 6 assigned to the concurrent inflow preheating pre-heating of air upwardly to the heating flues 1 and outflow of spent combustion gases downwardly from the heating flues 1.

The various regenerators 5 for gas or air and 6 for air are divided by partitions 12 into a number of compartments that correspond each with one heating flue 3 in the heating wall or walls 2 connected with the regenerator considered. The respective regenerators may also be divided into several compartments corresponding each with a number or group of flues, instead of individual flues, without departing from the spirit of the invention.

Arranged in the bottoms of the regenerators are horizontal sole channels 13 that extend over the whole length of the respective regenerators and communicate at one or either end thereof with valves by means of which they can be set into communication either with a waste combustion gas collecting or stack flue 15 leading to the smoke stack, or with an air supply for both the regenerators 5, 6, for rich fuel gas heating, or a lean gas supply to the regenerators 5 where the heating is to be carried out with lean gas, the air being fed into only the regenerators 6 and the lean gas into the regenerators 5 in the latter event.

Visible in Fig. 2 is a change-over valve box 14 by means of which the channel 13 of the related regenerator can be connected with either the waste combustion gas exhaust manifold, tunnel, or stack flue 15 or with the lean gas inlet main or manifold 16.

Where rich gas is used for heating the ovens 1, the regenerators 5, 6 are both employed for the preheating of the air. Value box 14 is then cut out or off from manifold 16, whereby air can be admitted into the regenerators 5 at the desired times through air valve 17 which is cut in for communication with the change-over valve box 14 in place of the valve for the lean gas main 16.

Arranged below in the oven basement is a manifold 18 extending longitudinally of the battery (Fig. 2) through which rich gas can be led into the various heating flues 3 through means including connections 19′ (Fig. 2) and the pipes transversely extending pipes 19 and their individual connecting branches 20, Fig. 1, which are provided for feeding the bottom of the various pipes 11 that lead up to the vertical flues 3. Arranged in the branch pipe lines 20 are diaphragms or equivalent flow-regulating devices (not shown, but like those devices 33, 35, in pipe lines 32, 34); adapted to ensure correct distribution of the gas amongst the various heating flues. Stop valves 21 and change-over valves 22 (Fig. 2) are provided, by which means the rich gas can be fed into the heating flues of the related heating walls at the desired times from rich gas main 18.

Arranged likewise in the basement below the ovens are a pair of manifolds 23, 24 (Fig 2) through which lean gas and low-pressure air can respectively be led into the ovens through sole channels 13 concurrently with inflow of lean gas or air from box 14. The lean gas manifold 23 is connected through stop valves 25 and change-over valves 26 to lean gas pipe lines 27 which feed to the sole channels 13 for the wide regenerators 5 for lean gas or air. Likewise, the air manifold 24 is connected through a change-over valve 28 with the air pipe line 29 which feed to the sole channels 13 for the narrow air regenerators 6.

The horizontal sole channels 13 located at the bottom of the regenerators communicate with the various compartments of the related regenerators through convergent-divergent orifices 30. Associated with each orifice is a nozzle 31, the nozzles 31 which are assigned to wide regenerators 5 for lean gas or air communicating with the lean gas pipe lines 27 through pipe lines 32, Fig. 1, in which diaphragms or like flow-controlling devices 33 are mounted, Figs. 1 and 2, while the nozzles 31 which are assigned to narrow regenerators 6 for air communicate with the air pipe lines 29 through pipe lines 34 having diaphragms or like flow-controlling devices 35 mounted therein.

Where the battery is heated with lean gas the bulk of the latter is supplied to the regenerators 5 and their sole channels 13, through the lean gas manifold or main 16 and the change-over valve boxes 14. Likewise, the bulk of the air is supplied by air valve 17 through the change-over valve boxes 14 connected with the channels 13 of the air regenerators 6.

The complementary lean gas and air necessary for the heating process are admitted through the complementary manifolds 23 and 24 and the complementary nozzles 31.

Owing to the provision of the convergent-divergent orifices 30 and of the nozzles 31 in the sole channels the amount of gas or air that flows from the horizontal sole channel 13 into the various compartments of regenerators 5 and 6 will vary in relation with the gas or air delivery through the nozzles 31. Consequently, by suitably manipulating either flow-controlling means 33 or 35, both of which are located outside the ovens and deal with cold gas, it is possible as desired to control the amount of air or gas fed from the gas boxes 14 by the sole channels into the various compartments of the regenerators 5 or 6 and thereby to satisfactorily distribute the air and the gas from and to the regenerators amongst the various flues in the walls. Such a distribution will remain steady irrespective of the working of the ovens or of variations in the gases used.

Figs. 3, 4 and 5 illustrate various arrangements of the complementary nozzles and the orifices 30. As shown in Fig. 3, the nozzle 31 is located coaxially with the related channel 13. In the arrangement according to Fig. 4 it is located off-center close to the vertical side walls of sole channel 13 and may even be solid therewith. According to Fig. 5 the nozzle is provided in the partition wall 9 of the related regenerator.

In each instance, the nozzles are located within the sole channels and discharge into the flow area of the sole channels adjacent to, but in spaced relation with, the inlet end of the orifice member and axially thereof so as to aspirate gas, flowing through their sole channels from the regenerator reversal box 14, from the sole channels through the orifice members into the upper regenerative area 5, 6, of the regenerators.

Of course, many other arrangements are possible on the only condition that the nozzle 31 is properly located with respect to the related orifice 30.

Instead of admitting lean gas and air into the manifolds 23 and 24 during inflow operation of the regenerators and their sole channels, air, spent combustion gases or any desired inert fluid may be supplied to the manifolds 23, 24, under a slight pressure during outflow from the regenerators 5, 6, to their sole channels, for flow of spent combustion products from the heating flues to the waste gas flue 15. The change-over or flow reversal means 26 and 28 will then be so arranged that the said fluid is fed into the spent combustion products gas operated regenerators, i. e. the ones which are connected with the waste gas tunnel or manifold 15 through the change over valves of boxes 14.

For this, the change over, or flow reversing, means may comprise the conventional reciprocable cable, or chain, or rod, 43 having a member 44 for moving reversing valve lever 45 in one direction, to open, and a member 46 for moving the lever 45 in the opposite direction to close the valves, the member 46 being adjustable on the cable, as shown diagrammatically in Figs. 9 and 10, to move the lever 45 to only partially close, or not close at all, the change over valves, for instance valves 26, 28.

In this case the provision of the nozzles 31 and the convergent-divergent orifices 30 will set up a slight back-pressure at the bottom of the compartments of the related regenerator 5 or 6, which will result in a decrease in the total amount of spent combustion products gases flowing out of a regenerator through said orifices 30, that is, into its sole channel 13, and hence results in a decrease in the amount of air and gas admitted into the bottom of the heating flues in the related wall for combustion therein. Consequently, by suitably manipulating the control members 33 or 35, it will be possible to alter the amount of fuel and air admitted for combustion into the various heating flues 3; in this case a separate control should be effected for each group of flues associated with one and the same crossover channel 4.

As shown in Fig. 6 the nozzles 31 for the sole channels 13, for regenerators 5, 6 may be connected with any one of a pair of pipes 36, 37 through the former of which lean gas or air is supplied to regenerators 5 depending on whether lean gas or air is to be preheated in the regenerators 5, and air is supplied to the regenerators 6, when air is to be preheated in the regenerators 6; the other pipe 37 serves for the admission of any desired fluid such as air or combustion gases. The change-over means for the pipe lines 36 or 37 should be manipulated in such manner that lean gas or air is admitted through pipe 36 when the related regenerator, 5 or 6, serves for the pre-heating of air or gas, while the inert fluid is led in through pipe 37 during those periods when spent combustion product gases are fed out of the heating flues 3 into the corresponding regenerator for delivery to the tunnel 15 through orifice 30 and sole channel 13.

By manipulating both of the flow-controlling means 38 and 39 it will be possible not only to distribute the inflow of lean gas and the air for combustion as desired amongst the various compartments of the regenerators 5, 6 and consequently amongst the various heating flues 3 but also to influence the pressure conditions in the various regenerative heating flue systems, by the action of the complementary jets at the orifices 30 during both inflow to and outflow from the regenerators at the orifices 30.

It will therefore be possible to obtain pressure conditions such that substantially equal pressures prevail in the various compartments of regenerators 5 and 6 assigned to the pre-heating of the lean gas or the air. A result of such equality in the pressures is that a satisfactory distribution of the lean gas and the air, as controlled by means of the devices 38, will not be put into question as to whether this distribution is later dissipated or lost by reason of pressure differentials, in the event the walls 12 should become leaky.

Figures 7 and 8 illustrate a modification in which not the whole amount but a fraction of the flow of fluid admitted into the bottom of each heating flue 3 is controlled by nozzle 31. In this case a number of partitions 12, Fig. 2, may be done away with.

Associated with each regenerator duct or passageway 7 or 8 connecting the renegerator with the oven wall heating flues is an earthware stack channel 40. The elements of the stack channel provide a gas-tight channel in which baffles are arranged to increase the area available for the direct exchange of heat between the combustion gases and the air or gas.

The upper ends of the stacks 40 are narrowed at 41 so that the fluids shall be accelerated as they enter the orifices or ducts 7 or 8 between the regenerators and the heating flues 3.

Provided at the bottom of each stack 40 is a convergent-divergent orifice 30 leading from the related channel 13 and cooperating with a nozzle 31 in the sole channel.

In addition, the channels 13 communicate with the regenerators proper through a separate series of ducts 42 located outside the stacks 40.

By suitably influencing the amount of complementary gas supplied to the various nozzles 31 in the sole channels it is possible as desired to vary the amount of air or gas flowed through the stacks 40 from the sole channels and consequently through the orifices or ducts 7, 8 leading into the various flues 3. The stacks 40 should be so arranged with respect to the ducts or orifices 7, 8 that the fluid supplied through the said stacks 40 will exert a slight sucking action upon the fluid from duct 42 that flows normally from the top of the same regenerator into the ducts or orifices 7, 8. In fact, it is only necessary for that purpose that an increase in the amount of fluid delivered through the stacks 40 shall not involve any substantial decrease in the amount of fluid flowing directly from the part of the regenerator around the stack 40 into the flue through the orifices or ducts 7 or 8.

Under these conditions the possibility is still retained of individually controlling the amount of air or gas fed from the regenerators into the various heating flues 3 of the heating wall 2.

What I claim as my invention and desire to secure by Letters Patent is:

1. In a regenerative coke oven to be heated by combustion with uniform distribution and supply of the regenerator gases, as well as the heating gases, to and from the heating flues by the regenerators through flow controlling means individualized to different parts of the respective regenerators, the combination with a series of alternate coking chambers and vertically flued heating walls arranged side by side; regenerators beneath the coking chambers and heating walls and directly connected at their upper parts with the lower parts of the heating flues; and sole channels at the bottoms of the respective regenerators; of a series of convergent-divergent orifices for each sole channel and distributed along the same, through which the respective sole channels are set into communication with the various parts of their respective regenerator chambers, each of said orifices being individualized to a part of the vertical flues in communication with its regenerator; means for supplying gaseous media for combustion in the heating flues to the respective regenerator sole channels for inflow delivery by each sole channel in common to its series of orifices; means for withdrawing spent products of combustion in the heating flues from the respective regenerator sole channels with outflow withdrawal of the spent combustion products in common through each sole channel from its series of orifices; complementary nozzles individualized to the respective orifices for separately introducing gaseous media thereto, each of said complementary nozzles being located within the sole channel and disposed to discharge into the sole channels adjacent to but in spaced relation with, the inlet ends of, and axially of their orifice members in the form of a jet at the region of juncture of each orifice with its sole channel to aspirate gas from the sole channels through the orifices into the upper regenerative areas; means for separately connecting each of said complementary nozzles with a source of supply of gaseous media for combustion during inflow operation of their associated sole channels; and means for separately connecting said complementary nozzles with a source of supply of non-combustible gas during outflow operation of their associated sole channels.

2. In a regenerative coke oven to be heated by combustion of fuel gas and regeneratively preheated air with uniform distribution and supply of the heating gases by the regenerators through flow controlling means individualized to different parts of the respective regenerators, the combination with a series of alternate coking chambers and vertically flued heating walls arranged side by side; regenerators beneath the coking chambers and heating walls and directly connected at their upper parts with the lower parts of the heating flues individually; means for feeding fuel gas into the lower parts of the heating flues individually; and sole channels at the bottoms of the respective regenerators; of a series of convergent divergent orifices for each sole channel and distributed along the same, through which the respective sole channels are set into communication with the various parts of their respective regenerator chambers, each of said orifices being individualized to a part of the vertical flues in communication with its regenerator; means for supplying gaseous media for combustion in the heating flues to the respective regenerator sole channels for inflow delivery of the media for combustion by each sole channel in common to its series of orifices; means for withdrawing spent products of combustion in the heating flues from the respective regenerator sole channels with outflow withdrawal of the spent combustion products in common through each sole channel from its series of orifices; means for regulating the distribution of gas flow along the sole channel and through said orifices comprising a series of complementary nozzles, each complementary nozzle being individualized to a respective orifice for separately introducing individually regulable amounts of gaseous media thereto, each of said complementary nozzles being located within the sole channels and disposed to discharge into the same adjacent to, in spaced relation with and axially through the sole channel ends of their orifices in the form of a jet at the region of juncture of each orifice with its sole channel; and means for separately connecting each of said complementary nozzles with a source of supply of gaseous media.

3. Apparatus as claimed in claim 2, and in which each regenerator is provided with stacks separated from the remaining part of the regenerator, each of said stacks extending from one of the series of convergent-divergent orifices upwardly to an inlet leading to a heating flue from the remaining part of the regenerator surrounding the stack, each said stack communicating at its lower end with its orifice, and communicating at its upper part with the said inlet to a heating flue leading thereto from the part of the regenerator surrounding the stack; and a series of orifices for each regenerator separate from the series of convergent-divergent orifices therefor, for separately connecting the base of the remaining portion of each regenerator directly with the same sole channel with which its regenerator stacks communicate through the series of convergent-divergent orifices therefor.

4. Apparatus as claimed in claim 2, and in which the means for separately connecting the complementary nozzles with a source of supply of gaseous media comprises, means for connecting them for such supply during the inflow operation of their associated sole channels, whereby to aspirate gaseous media from inside of the sole channels through their orifices.

5. Apparatus as claimed in claim 2, and in which the means for separately connecting the complementary nozzles with a source of supply of gaseous media comprises means for connecting them for such supply during the outflow operation of their associated sole channels, whereby to repress the outflow of waste gas from the regenerators through the orifices in the sole channels.

FERNAND ROBERT.

REFERENCES CITED

The following references are of record in the file of this patent:

UNITED STATES PATENTS

| Number | Name | Date |
|---|---|---|
| 1,154,298 | Ellingen | Sept. 21, 1915 |
| 2,159,359 | Philipsen | May 23, 1939 |
| 2,313,764 | Otto | Mar. 16, 1943 |
| 2,334,612 | Davis | Nov. 16, 1943 |
| 2,507,554 | Van Ackeren | May 16, 1950 |

FOREIGN PATENTS

| Number | Country | Date |
|---|---|---|
| 130,938 | Austria | Mar. 15, 1932 |
| 407,716 | Great Britain | Mar. 20, 1934 |
| 561,291 | Great Britain | May 12, 1944 |